United States Patent
Leyland

(10) Patent No.: US 9,433,867 B2
(45) Date of Patent: Sep. 6, 2016

(54) VIDEO GAME WITH BACKWARDS-COMPATIBLE TOYS

(71) Applicant: Activision Publishing, Inc., Santa Monica, CA (US)

(72) Inventor: Robert Leyland, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 148 days.

(21) Appl. No.: 13/914,325

(22) Filed: Jun. 10, 2013

(65) Prior Publication Data

US 2014/0364240 A1    Dec. 11, 2014

(51) Int. Cl.
*A63F 13/77* (2014.01)
*A63F 13/235* (2014.01)
*A63H 3/00* (2006.01)

(52) U.S. Cl.
CPC ............ *A63F 13/77* (2014.09); *A63F 13/235* (2014.09); *A63H 3/003* (2013.01); *A63H 2200/00* (2013.01)

(58) Field of Classification Search
CPC ...... A63F 13/12; A63F 13/77; A63F 13/235; A63F 2300/206; A63F 2300/207; A63F 2300/80; A63F 2230/8094; A63H 3/003; A63H 2200/00
USPC .......................................... 463/1, 43–45, 47
See application file for complete search history.

(56) References Cited

U.S. PATENT DOCUMENTS

| | | | | |
|---|---|---|---|---|
| 6,009,458 | A | * | 12/1999 | Hawkins et al. ............. 709/203 |
| 6,773,325 | B1 | * | 8/2004 | Mawle et al. ................ 446/175 |
| 2006/0107824 | A1 | * | 5/2006 | Bando ..................... G10L 25/00 84/616 |
| 2007/0155505 | A1 | * | 7/2007 | Huomo .......................... 463/42 |

OTHER PUBLICATIONS

Backwards Compatibility Concept retrieved from giantbomb.com (http://www.giantbomb.com/backwards-compatibility/3015-1053/), pp. 1-3, Mar. 7, 2013 edition (retrieved from waybackmachine, https://web.archive.org/web/20130307103110/http://www.giantbomb.com/backwards-compatibility/3015-1053/).*

* cited by examiner

*Primary Examiner* — Jasson Yoo
(74) *Attorney, Agent, or Firm* — Klein, O'Neill & Singh, LLP

(57) ABSTRACT

Aspects of the present invention relate to a computer-implemented method useful in playing a video game having multiple versions, the method being implemented by a video game platform that includes one or more processors, the method comprising: executing a version of the video game on the video game platform; receiving information from a memory of a toy, the information comprising type information and subtype information; displaying a representation of a game character associated with the toy, the representation of a game character based at least on the type information; using the subtype information to determine whether the toy corresponds to a different version of the video game than the version being executed; and conducting gameplay involving the representation of the game character, wherein aspects of gameplay are based in part on whether the toy corresponds to a different version of the video game than the version being executed.

16 Claims, 17 Drawing Sheets

| Toy Type | Numeric Code |
|---|---|
| Dave the Dragon | 00000000 |
| Nick the Knight | 00000001 |
| Wally Wizard | 00000010 |

Fig. 9B

| Version | Description | Numeric Code |
|---|---|---|
| 2011 | Original Release | 00000000 |
| 2012 | First Sequel | 00000001 |
| 2013 | Second Sequel | 00000010 |

Fig. 9C

| Feature | Description | Numeric Code |
|---|---|---|
| Normal | Standard unaltered toy | 00000000 |
| Repose 1 | Alternate toy pose for 2012 release | 00000001 |
| 2012 Promo | Alternate toy decoration for 2012 promotion | 00000010 |
| Repose 2 | Alternate toy pose for 2013 release | 00000011 |
| Light-enabled | Toy supports light-up electronics | 00000100 |

Fig. 9D

VIDEO GAME WITH BACKWARDS-COMPATIBLE TOYS

BACKGROUND OF THE INVENTION

The present invention relates generally to video games and, more particularly, to a video game and a peripheral for a video game.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Merely interacting with a displayed simulated environment may not allow game players to fully relate to game play, with a sharply distinct separation between a game play world and the world physically inhabited by the game players. Moreover, when the electronic device providing game play action is unavailable, for example when off or used for other purposes, as may often by the case when the electronic device is a personal computer, reminders of the joy of game play may also be unavailable. U.S. patent application Ser. No. 13/109,956, assigned to the present assignee and incorporated by reference in its entirety, describes examples of video games including physical objects (e.g., toys) associated with video game play. The toys may have an associated identifier which allows for virtual use in a video game of a game character associated with the toy.

New versions of a video game may be released over time, and the new versions of the video game may have new (in whole or in part) toys and associated game characters. The characters associated with the new toys may have different features or capabilities, possibly not contemplated by designers of earlier games, and the toys themselves may have features or capabilities, similarly possibly not envisioned by designers of earlier games. Users of earlier games, however, may desire to be able to enjoy use of the new toys and associated characters, but these users may be unable or unwilling to invest in or acquire the newer versions of the video game.

BRIEF SUMMARY OF THE INVENTION

One aspect of the invention provides a video game system, comprising: a first version of a video game; a first toy associated with the first version of the video game, the first toy including memory; a second toy associated with the second version of the video game, the second toy including memory; a peripheral configured to read data stored in the memory of the first toy when the first toy is proximal to the peripheral and configured to read data stored in the memory of the second toy when the second toy is proximal to the peripheral; a processor configured by program instructions and coupled to the peripheral, the program instructions comprising instructions to: receive data read from the memory of the first toy; utilize data read from the memory of the first toy to determine that the first toy is associated with the first version of the video game; conduct gameplay involving a representation of a game character associated with the first toy, wherein aspects of gameplay are based in part on the determination that the first toy is associated with the first version of the video game; receive data read from the memory of the second toy; utilize data read from the memory of the second toy to determine that the second toy is associated with another version of the video game; and conduct gameplay involving a representation of a game character associated with the second toy, wherein aspects of gameplay are based in part on the determination that the second toy is associated with the second version of the video game.

One aspect of the invention provides a computer-implemented method useful in playing a video game having multiple versions, the method being implemented by a video game platform that includes one or more processors, the method comprising: executing a version of the video game on the video game platform; receiving information from a memory of a toy, the information comprising type information and subtype information; determining whether the type information indicates the toy is associated with a game character known to the version of the videogame; determining whether the subtype information indicates that the toy is associated with a version of the game character known to the version of the video game; and if the toy is associated with a game character known to the version of the video game, displaying a representation of the game character associated with the toy, the representation of a game character based at least on the type information, the subtype information, and whether the toy is associated with a version of the game character known to the version of the video game; conducting gameplay involving the representation of the game character, wherein aspects of gameplay are based in part on whether the toy corresponds to a different version of the video game than the version being executed.

These and other aspects of the invention are more fully comprehended upon review of this disclosure.

BRIEF DESCRIPTION OF THE FIGURES

FIG. 9B is a table illustrating an encoding of fixed information in accordance with aspects of the invention;

FIG. 9C is a table illustrating an encoding of fixed information in accordance with aspects of the invention;

FIG. 9D is a table illustrating an encoding of fixed information in accordance with aspects of the invention;

DETAILED DESCRIPTION

Figure 1:
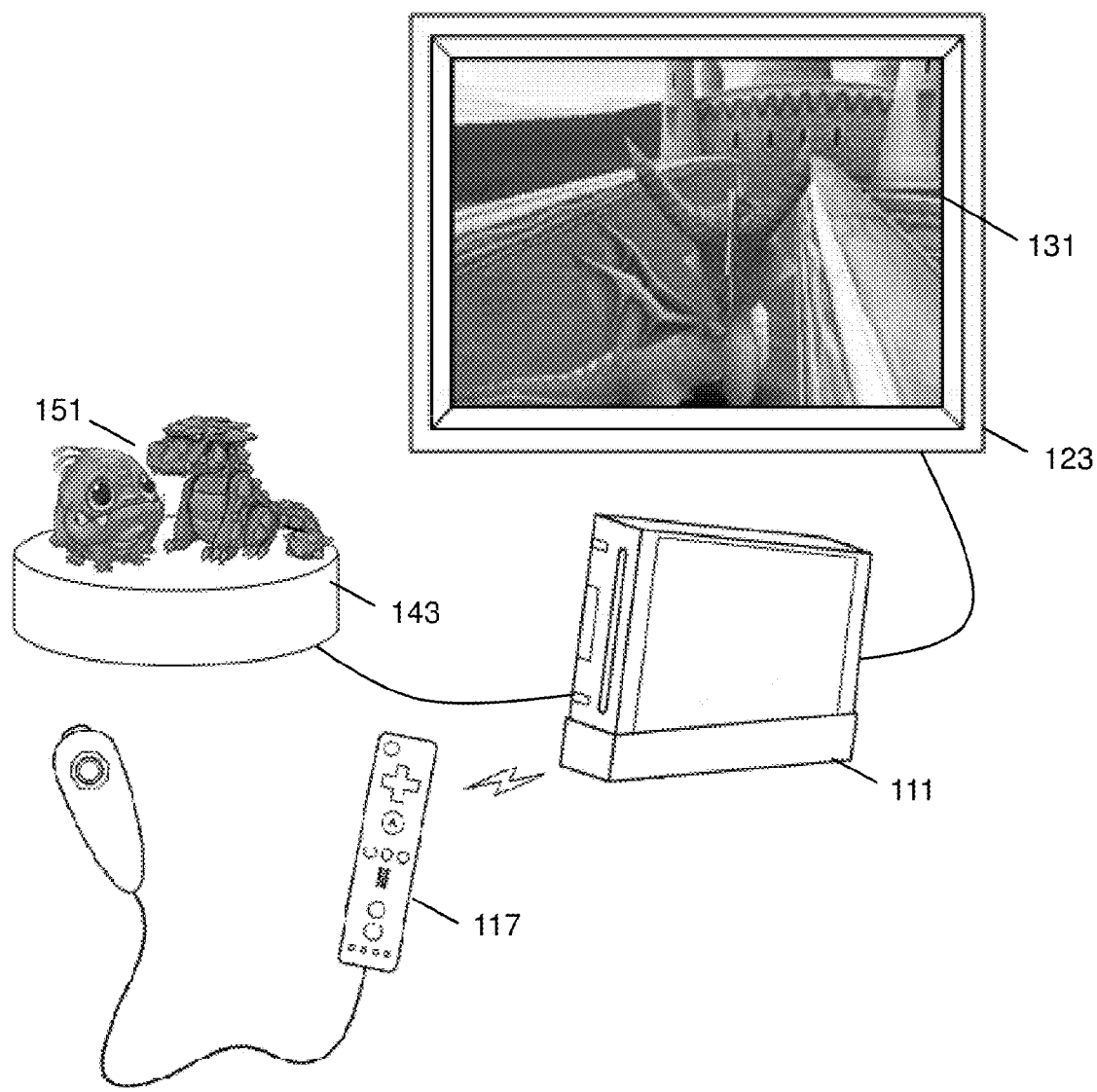
FIG. 1 illustrates an example of a video game system in accordance with aspects of the invention.

FIG. 1 illustrates an example of a video game system in accordance with aspects of the invention. The video game system includes a game console 111 with a processor for executing program instructions providing for game play and associated circuitry, user input devices such as a game controller 117, a display device 123, and a toy reader 143, which in various embodiments includes the capability to provide write information to a toy but for convenience will generally be termed a reader. The processor, responsive to inputs from the user input devices and the toy reader, generally commands display on the display device of game characters in and interacting with a virtual world of game play and possibly each other. In addition, the processor, responsive to inputs from the reader, may also add characters and objects to the virtual world, with the characters able to manipulate the added objects and move about the virtual world. For example, the processor may include characters in game play based on inputs from the reader, and the processor may control actions and activities of game characters based on inputs from the user input devices.

The instructions providing for game play are generally stored on removable media, for example, an optical disk. Accordingly, the game console may include an optical drive, for example, a DVD-ROM drive, for reading the instructions for game play. In some embodiments, the game console may be a personal computer, including similar internal circuitry as herein described, as well as, for example, a built-in display and built-in user input devices, such as a keyboard and a touch pad.

The display device is generally coupled to the game console by a cable, although in some embodiments a wireless connection may be used. In many embodiments, the display device is a liquid crystal display. In some embodiments, the display device is a television. A display screen 131 of the display device displays video images of game play, generally as commanded by the processor or other associated circuitry of the game console. In the embodiment of FIG. 1, the display screen shows a screen shot of video game play. As illustrated, the screen shot shows a display of a character, generally controlled by and animated in accordance with user inputs, approaching an inanimate item in the form of what may be considered a castle.

The toy reader, in some embodiments and as shown in FIG. 1, has a substantially flat upper surface for placement of toys thereon. The game player generally places game toys, for example, objects 151 in the form and representative of a dragon and another fantasy figure as shown in FIG. 1, on the flat surface of the reader during game play. The toys are generally in the form of and representative of game items such as game characters or other game items. In most embodiments, the toys are associated with game characters during game play.

Each toy includes machine-readable information, for example, one or more memories, radio-frequency identification (RFID) tags, near-field communication (NFC) tags, or/and barcodes. The machine-readable information may be sensed, read, and/or in some embodiments written, by the reader, in some embodiments indirectly by way of sending data and commands to the toy to write the data to memory of the toy. The machine-readable information may include one or more numeric identifiers. The machine-readable information allows the reader, or the processor of the game console, to distinguish one toy from other toys, and the machine-readable information may therefore be considered to include a toy identifier, and in some embodiments, each particular toy has its own distinct identifier. In addition, in many embodiments the machine readable information includes additional information about a corresponding game character, including in some embodiments, status of the game character in a game. Talk about various fields of identifiers here. Toy ID, subtype, etc.

When a toy is read by the reader, the reader provides the game console an indication of the identifier and status information of the toy, and generally the processor of the game console commands display of a corresponding game character or otherwise makes the corresponding game character available in game play. Likewise, when a toy in the form of an article such as a hat is placed on the reader, the processor may make a corresponding article appear in the game and the article may effect changes or the ability to make changes in the game. For example, when a hat toy and a character toy are concurrently on the reader, the corresponding character in the game may possess the corresponding hat. Thus, video game play may be affected by use of real world objects, objects which may also be utilized for play and/or observation separate from video game play.

Figure 2:
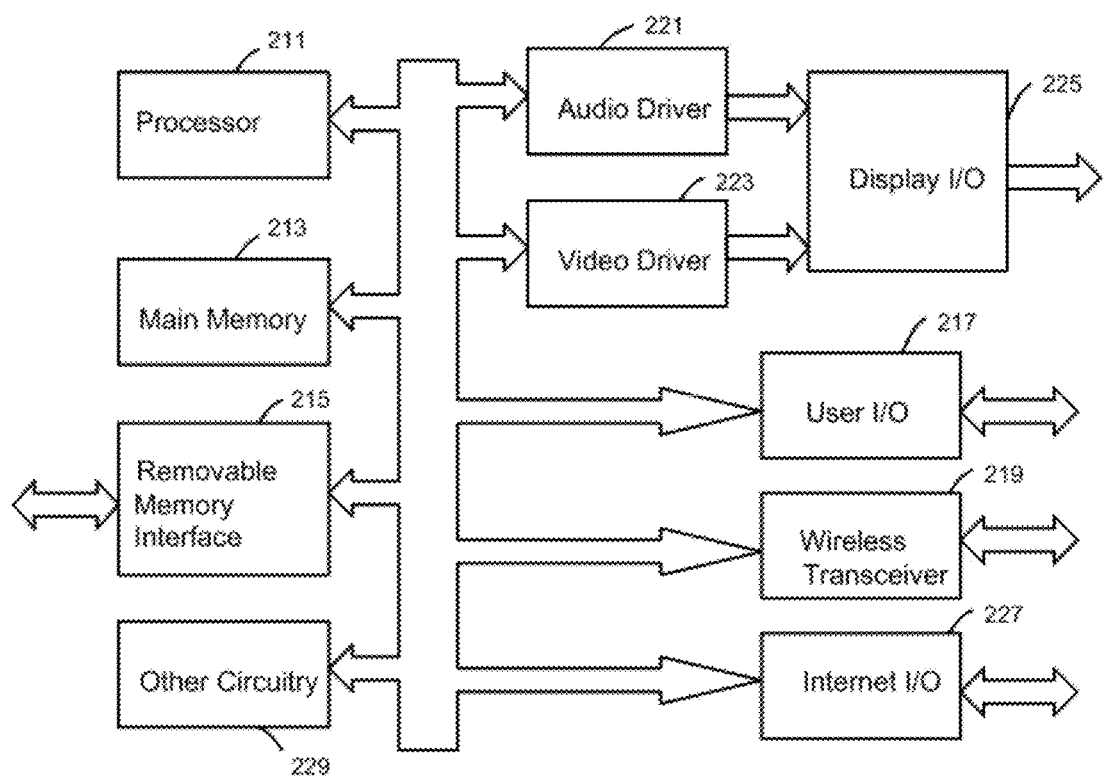
FIG. 2 is a block diagram of a video game console in accordance with aspects of the invention.

FIG. 2 is an example of a block diagram of a processor and associated circuitry, for example, for a game console, useful in accordance with aspects of the invention. As shown in FIG. 2 a processor 211 is connected to other components via a bus. The other components include a main memory 213 and a removable memory interface 215 generally coupled to a removable memory device, for example, a DVD-ROM drive. The processor may execute instructions retrieved from the removable memory device to control game play and store game state information in the main memory. For example, the instructions may be for determining possible movements, positions, and locations of a game character.

The processor is coupled to an audio driver 221 and a video driver 223. The audio driver produces sound signals and the video driver produces image signals. The sound signals and image signals are transmitted from the game console via a display I/O device 225. The display I/O device generally supplies the sound and image signals to a display device external to the game console. Sound signals may also be supplied to a peripheral device such as a toy reader.

The processor may also be coupled to a user I/O device 217, a wireless transceiver 219, an Internet I/O device 227, and other circuitry 229. The user I/O device may receive signals from a toy reader and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Figure 3:
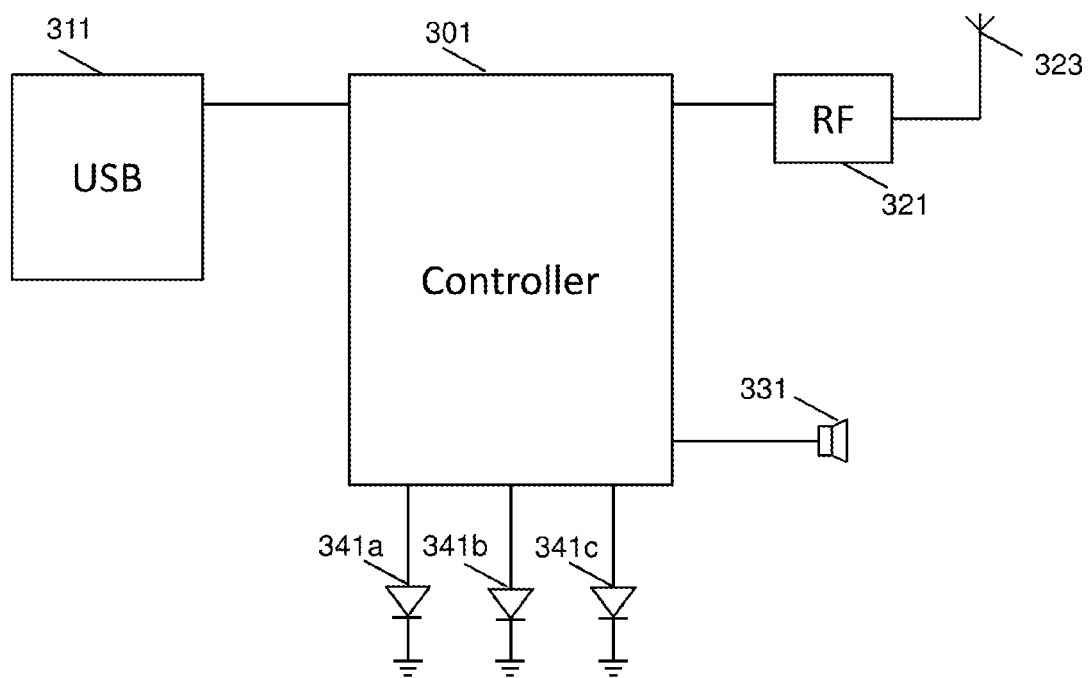
FIG. 3 is a block diagram of a video game peripheral in accordance with aspects of the invention.

FIG. 3 is a block diagram of a video game peripheral in accordance with aspects of the invention. The peripheral may be used in some embodiments as the toy reader of FIG. 1. The peripheral may be used to provide information from the toy to a game console and, in some embodiments, from the game console to the toy. Accordingly, the peripheral includes a universal serial bus (USB) interface 311 to communicate with the game console. In some embodiments, the peripheral may use a different interface, for example, a wireless interface for communication with the game console. The information communicated between the peripheral and the game console may be encrypted, and the information read from or written to the toy by the peripheral may also be encrypted. In some embodiments, the peripheral's functionality may be integrated into the game console itself.

The peripheral also includes a radio-frequency interface 321 to communicate with toys. In many embodiments, the radio-frequency interface is an RFID interface. In other embodiments, the peripheral may include a different interface for communicating with toys, such as an optical interface or a wired interface.

In one embodiment of an optical interface the toy includes a light source, for example an LED, to provide information of the machine readable information and a photodiode to receive information of commands, with circuitry operable within the toy to provide for associated operation of the LED and photodiode in performing communication functions. Power may be provided to the toy by way of a battery, by way of RFID operations, or by other sources. In such an embodiment the toy reader similarly includes a photodiode and LED for communication with the toy.

In another embodiment the toy reader includes an imaging device, for example a CCD and associated circuitry. In such embodiments the imaging device may generate an image, for analysis by the reader or in most embodiments by the game console, with the image providing information related to the toy. In some embodiments identity of the toy may be determined by shape or other features, such as color or reflectivity, of the toy or portions of the toy. Similarly, identity and other information of the toy may be provided by image information placed on the toy, including, for example, information of stickers placed on the bottom of the toy, placed either prior to receipt of the toy by a user or by the user, in which case the information may be changed by the user in accordance with game play results. The toy may instead or in addition may include bar code or bar code like information, with the reader including bar code scanning components.

Further in some embodiments the toy may include a wired connection to the reader, or in some embodiments, a wired connection to the game console, possibly dispensing with the reader. Similarly, in some embodiments the toy may include wireless communication capabilities of the type commonly used with computers, for example Bluetooth or Wi-Fi capabilities.

The peripheral includes a controller 301 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what toys are present on the peripheral or to read from or write to a particular toy. In other embodiments, the controller may independently communicate with the radio-frequency interface and supply resulting information to a game console over the USB interface. For example, the controller may, via the radio-frequency interface, regularly detect what toys are newly present on the peripheral and report the detected toys to the game console via the USB interface. The controller generally includes a programmable device such as a microprocessor performing program instructions. The program instructions may be stored in the peripheral as firmware or downloaded from the game console.

The peripheral also includes, in some embodiments, a loudspeaker 331. The loudspeaker provides audio signaling to game players and the signaling may relate to a particular toy present on the peripheral. In some embodiments, the peripheral includes visual indicators such as light-emitting diodes 341a-c. The diodes may, for example, be illuminated with intensities or colors that signal performance in the video game of characters associated with toys on the peripheral. Both the loudspeaker and visual indicators are coupled to the controller. The controller signals the loudspeaker and visual indicators to operate according to commands received via the USB interface.

Figure 4:
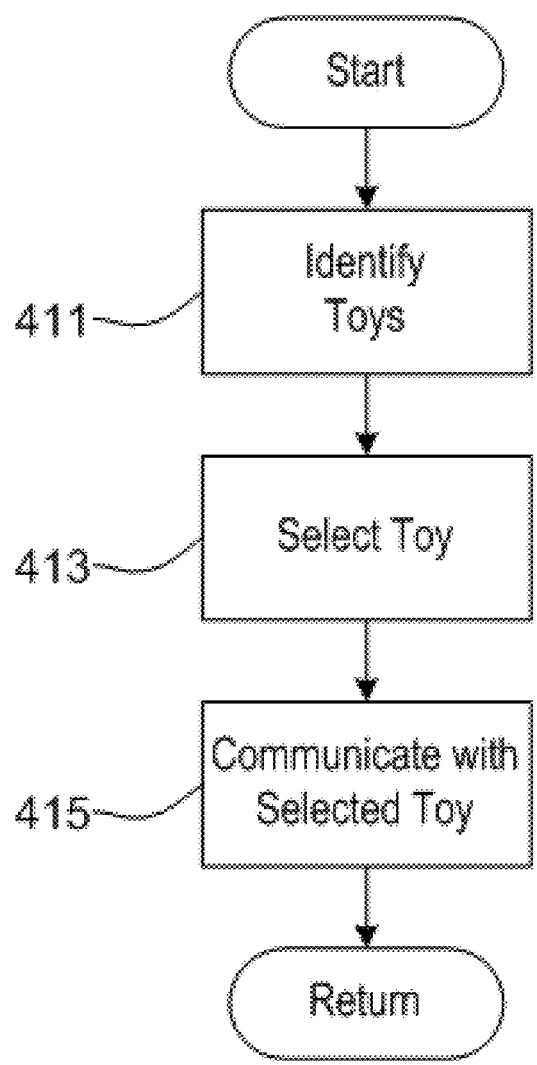
FIG. 4 is a flowchart of a process for communication with toys in accordance with aspects of the invention.

FIG. 4 is a flowchart of a process for communication with toys in accordance with aspects of the invention. The process may be implemented by a video game peripheral, a video game console, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toys via radio-frequency communication.

In block 411, the process identifies toys in a defined region. For example, the process may determine what toys are on the surface of a video game peripheral as shown in FIG. 3. In various embodiments, the toys may be identified by RFID, NFC, barcodes, or optical recognition. In one embodiment, identification of toys includes a video game peripheral reading identifiers of the toys and supplying the identifiers to a video game console. [types of identifiers]

In block 413, the process selects a toy for communication. The process may select the toy by transmitting a selection command having an identifier matching the identifier of the toy. In many embodiments, the process expects to receive an acknowledgment of the selection from the toy. When an acknowledgment is not received, the process may retransmit the selection command or may signal a video game associated with the process that the selected toy is not available.

In block 415, the process communicates with the selected toy. For example, the process may read from a particular memory location of the toy or may write to a particular memory location of the toy. In many embodiments, the process expects to receive an acknowledgment or response from the toy, and when not received, the process may retransmit the command or may signal the video game associated with the process that the selected toy is not available. The process thereafter returns.

Figure 5:
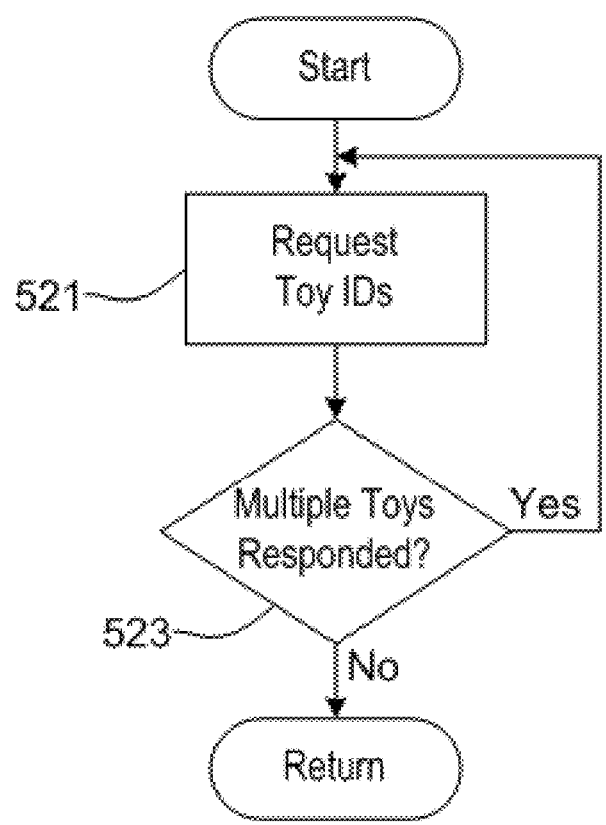
FIG. 5 is a flowchart of a process for identifying toys in accordance with aspects of the invention.

FIG. 5 is a flowchart of a process for identifying toys in accordance with aspects of the invention. The process may be performed as part of a process for communication with toys such as the process of FIG. 4. Accordingly, the process may be performed by a video game console, a video game peripheral, or a combination of devices, and the process may use a processor configured by program instructions.

In block 521, the process requests that toys send their identifiers. For example, in an embodiment of the process that uses the ISO/IEC 14443 protocol, the process may transmit a request command (REQA) or a wake-up command (WUP). The process listens for and receives any responses to the request that toys send their identifiers. Each identifier is generally unique to a particular toy.

In block 523, the process determines whether multiple toys responded to the request sent in block 521. For example, multiple toys may respond when there are multiple toys in a region that receives the request of block 521. The process may determine that multiple toys responded by detecting a collision between identifiers in the responses received in block 521. When the process determines that multiple toys responded, the process returns to block 521; otherwise, the process returns. The process may also determine that no toys responded. In various embodiments, the process may return when no toys responded or may return to block 521.

The process may, in block 521, include a range of identifiers in the request that toys send their identifiers. For example, the process may include a string of bits (for example, least-significant bits) in the request, with only toys having identifiers with starting bits having values that match the string being requested to send their identifiers. The process may iterate through block 521 and block 523 with an increasingly narrow range of identifiers in the request until an identifier is individually received from each toy. The string of bits included in the request that toys send their identifiers may include the bits that were received by the process in block 521 prior to the collision detected in block 523 followed by a zero bit, and in a subsequent iteration followed by a one bit. For example, after sending a request for all toys to send their identifiers, the process may receive a one bit and a zero bit followed by a collision of bit values. The process accordingly requests toys whose identifiers start with one, zero, and zero to send their identifiers, and depending on the response or responses received may add additional bits to the string of bits in the request for identification. The process later requests toys whose identifiers start with one, zero, and one to send their identifiers, and depending on the response or responses received may add additional bits to the string of bits in the request for identification. The process may iterate through block 521 and block 523 performing a binary tree search for identifiers.

Figure 6:
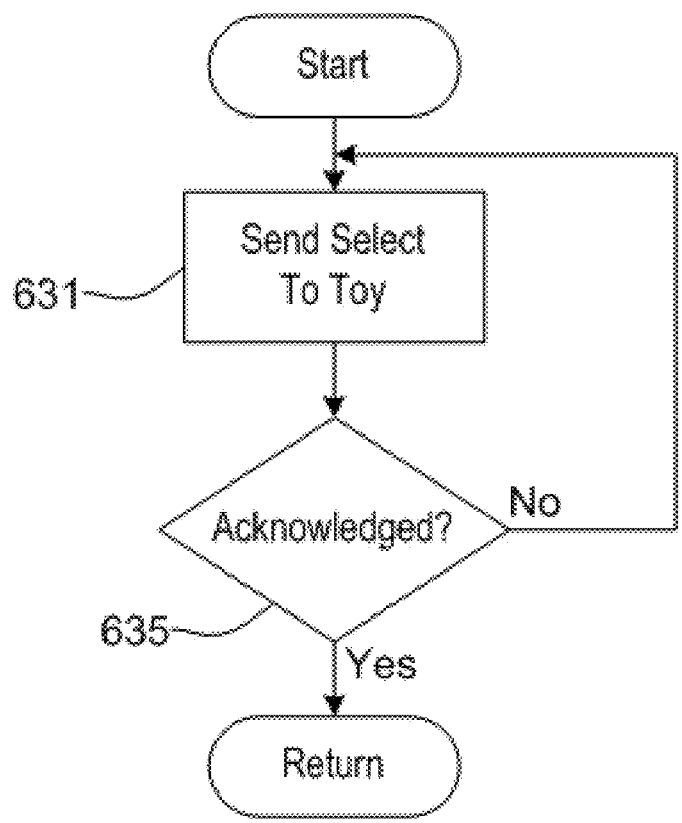
FIG. 6 is a flowchart of a process for selecting a toy in accordance with aspects of the invention.

FIG. 6 is a flowchart of a process for selecting a toy in accordance with aspects of the invention. The process may be part of a process for communication with toys such as the process of FIG. 4. Accordingly, the process may be performed by a video game console, a video game peripheral, or a combination of devices, and the process may use a processor configured by program instructions.

In block 631, the process selects a toy for further communication. The process may, for example, select the toy by sending a select command (SEL) that includes the identifier of the selected toy.

In block 635, the process determines whether it received an acknowledgment from the toy in response to the selection of block 631. The process may, for example, determine that it received an acknowledgment when it receives a selection acknowledge (SAK) message from the selected toy. When the process determines that it has received an acknowledgment, the process returns; otherwise, the process returns to block 631 to retry selecting the toy. In other embodiments, the process may return when an acknowledgment has not been received. When the process does not receive an acknowledgment, the process may additionally inform a video game associated with the process that the selected toy is not present.

Figure 7:
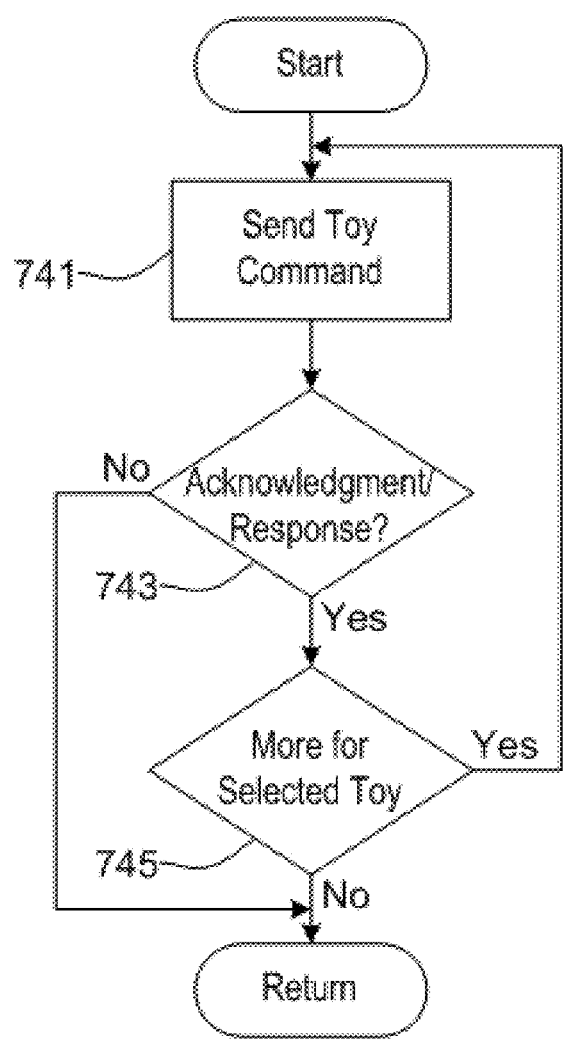
FIG. 7 is a flowchart of a process for communicating commands with a toy in accordance with aspects of the invention.

FIG. 7 is a flowchart of a process for communicating commands with a toy in accordance with aspects of the invention. The process may be as part of a process for communication with toys such as the process of FIG. 4. Accordingly, the process may be performed by a video game console, a video game peripheral, or a combination of devices, and the process may use a processor configured by program instructions.

In block 741, the process sends a command to the toy. For example, the process may send a read command to acquire data from the toy or a write command to supply data to the toy. Accordingly, the command may include an address value indicating a memory location in the toy to be accessed.

In block 743, the process determines whether it received an acknowledgment from the toy in response to the command sent in block 741. The process may, for example, determine that it received an acknowledgment when it receives a message containing a positive acknowledgment (ACK) from the toy. For a read command, the acknowledgment may include the data read. When the process determines that it has received an acknowledgment, the process continues to block 745; otherwise, the process returns. In other embodiments, the process may return to block 741 to retry sending the command when an acknowledgment has not been received. When the process does not receive an acknowledgment, the process may additionally inform a video game associated with the process that the toy being command to communicate is not present.

In block 745, the process determines whether it has any more commands to send to the toy. The process may determine that it has more commands for the toy, for example, by checking a list of actions in the video game associated with the process. When the process determines that there are more commands for the toy, the process returns to block 741; otherwise, the process returns.

Figure 8:
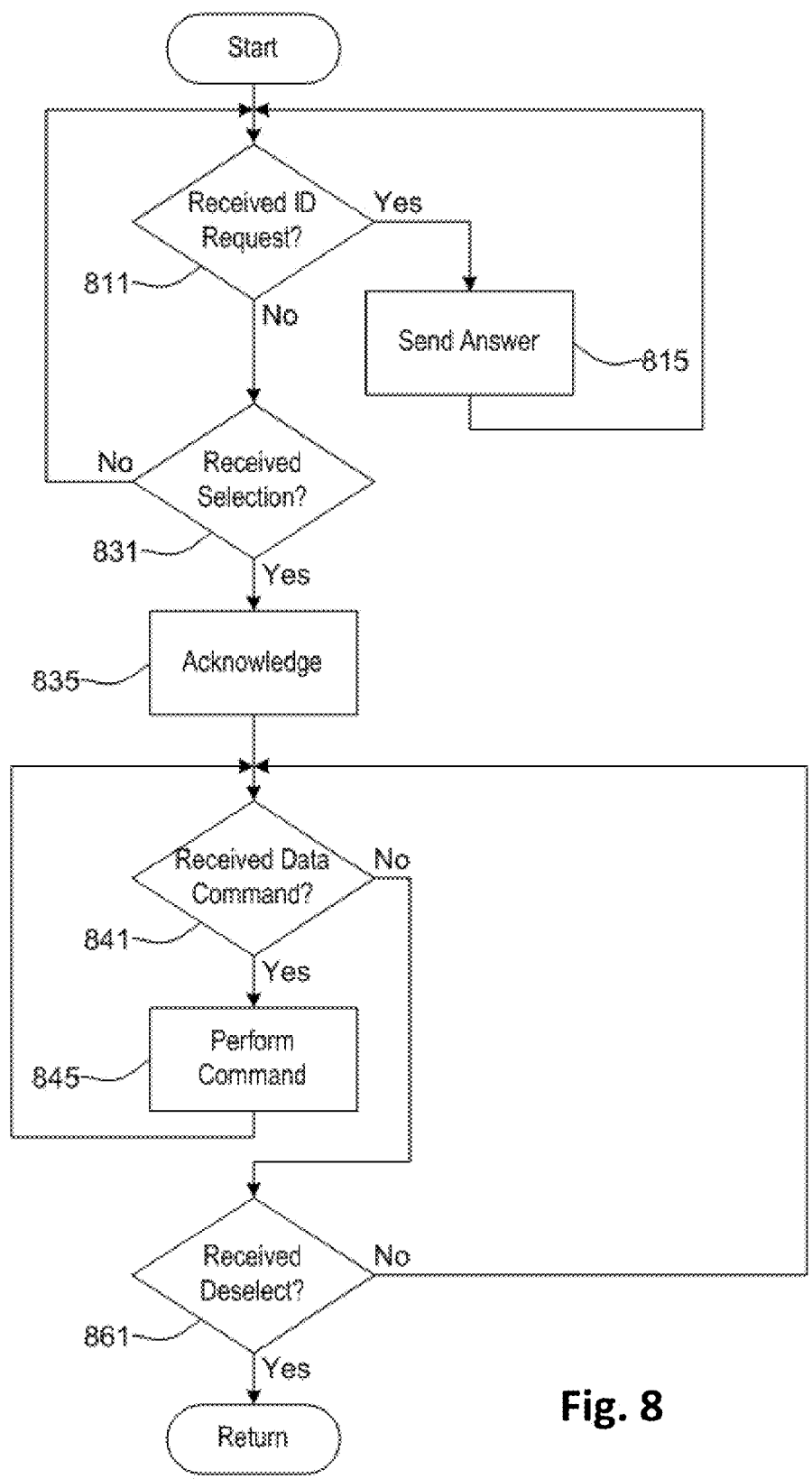
FIG. 8 is a flowchart of a process for communication with a video game peripheral in accordance with aspects of the invention.

FIG. 8 is a flowchart of a process for communication with a video game peripheral in accordance with aspects of the invention. The process may be implemented by a toy used in a video game, for example, one of the toys of FIG. 1. The process may be performed utilizing a standardized protocol, for example, the ISO/IEC 14443 standard for Identification Cards. Accordingly, the process may communicate with a video game peripheral via radio-frequency communication. Furthermore, the process may communicate with a video game peripheral that performs any of the process illustrated in FIGS. 4-7.

In block 811, the process determines whether it has received a request for an identifier associated with the toy. For example, in an embodiment of the process that uses the ISO/IEC 14443 protocol, the process may determine whether it has received a request command (REQA) or a wake-up command (WUP). A request for an identifier may include a range of identifiers that are requested to respond, and the process determines that it has received a request for its identifier when its identifier is within the requested range of identifiers. When the process determines that it has received a request for its identifier, the process continues to block 815; otherwise, the process continues to block 831.

In block 815, the process sends an answer to the request for its identifier. The answer generally includes the identifier or a portion of the identifier. For example, the request for the identifier may have included a portion of the identifier with the process including the remaining portion of the identifier in the answer. Thereafter, the process returns to block 811.

In block 831, the process determines whether it has been selected for further data communication. The process may, for example, determine that it has been selected when a select command (SEL) is received that includes the identifier of the toy. When the process determines that it has been selected, the process continues to block 835; otherwise, the process returns to block 811.

In block 835, the process acknowledges the selection determined in block 831. The process may, for example, transmit a selection acknowledge (SAK) message.

In block 841, the process determines whether it has received a data command. The process may, for example, determine that it has received a command instructing it to read data from or write data to a memory. When the process determines that it has received a data command, the process continues to block 845; otherwise, the process continues to block 861.

In block 845, the process performs the command of block 841. For example, the process may perform a read command by reading values from the memory and transmitting the values. In another example, the process may perform a write command by writing values supplied with command to the memory and transmitting an acknowledgment of the command. Thereafter, the process returns to block 841.

In block 861, the process determines whether it has been deselected from further data communication. The process may, for example, determine that it has been deselected when it receives a deselect command (DESEL) or a halt command (HLTA). When the process determines that it has been deselected, the process returns; otherwise, the process returns to block 841. In some embodiments, the process may wait in a halted state until it receives a wake-up command (WUP) before it returns. When the process is in the halted state, it does not respond to identification request commands, selection commands, or data commands.

Figure 9A:
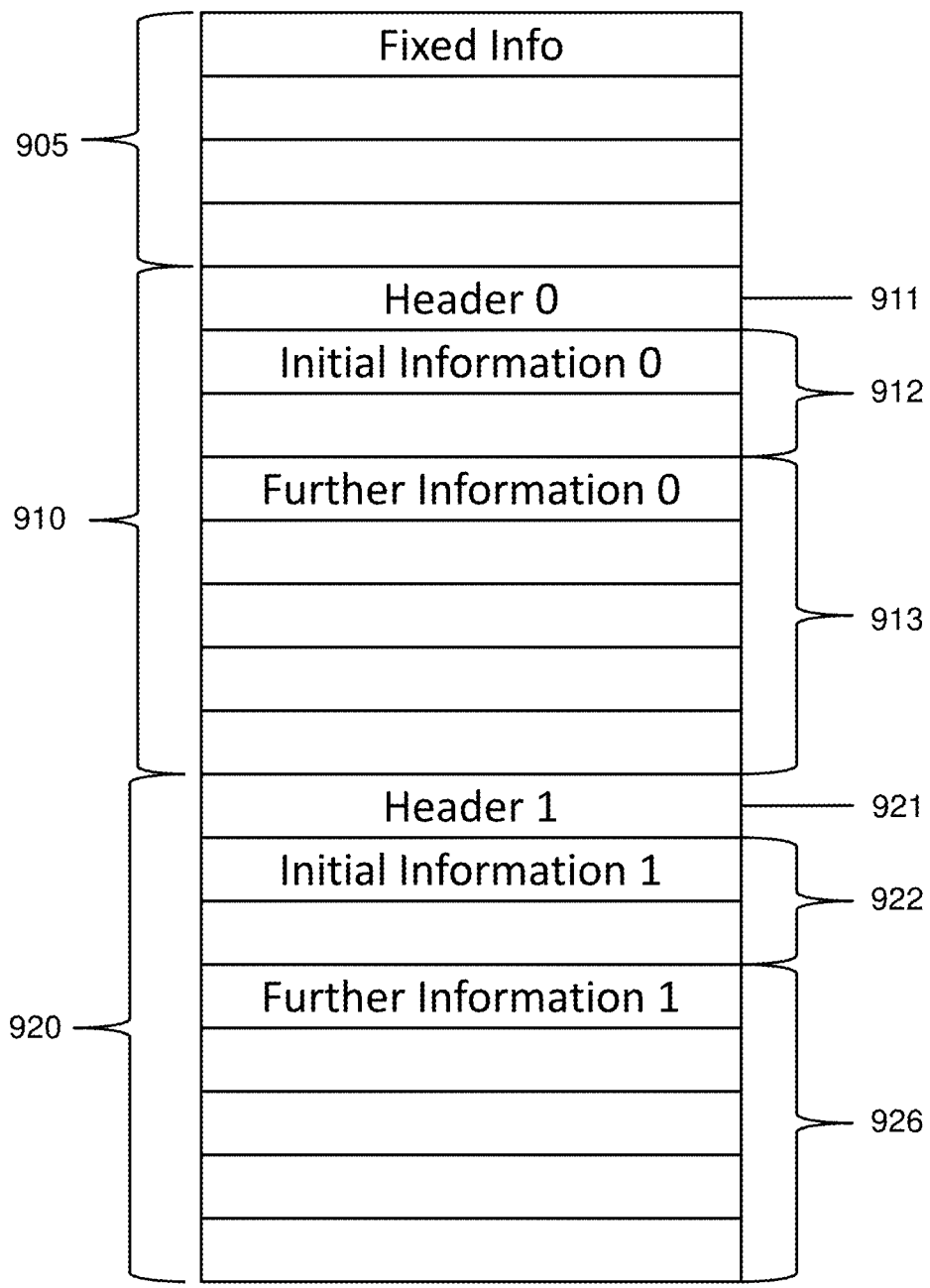
FIG. 9A is a diagram of a data structure in accordance with aspects of the invention.

FIG. 9A is a diagram of data structure in accordance with aspects of the invention. The structure may be used to store data in a memory of a toy. Information about the toy, such as its characteristics and its status, are stored at various locations in the data structure. Although various fields of the data structure are shown in particular locations in FIG. 9A, the data structure may use a different arrangement of the fields.

The data structure includes an area of fixed information 905. Fixed information 905 comprises various fields of information generally written when the toy is created and not thereafter changed. For example, fixed information 905 may include a serial number that uniquely identifies the particular instance of the toy. In some embodiments, the serial number may be a 32-bit serial number. Fixed information 905 may also comprise the toy's type information, which identifies the type of the toy. In some embodiments, the toy's type information may identify that the toy is representative of a particular in-game character, weapon, level, or item.

Fixed information 905 may further comprise a toy's sub-type information, which may further specify or indicate other fixed attributes relating to the toy or the particular in-game character, weapon, level or item of which the toy is representative. In some embodiments, the sub-type information may comprise version information that identifies the version of the video game that the toy is associated with, with in some embodiments the version of the video game being indicative of toy or corresponding game character or item characteristics or capabilities. For example, as new versions, updates, or sequels of a video game are released, new or updated toys may also be released in connection with those versions of the video game, and the toys may have new or different capabilities (for example of actuation or lighting) or appearance (for example of pose, size, or coloring), and the corresponding game character or item may also similarly have new or different capabilities or appearance. The version information may thus specify the particular version that the toy is released in connection with or originally made for. Additionally or alternatively, the toy's sub-type information may identify other fixed features of a toy, for example, whether the toy is equipped with audio-visual components such as light-up effects, a display, speakers, or other components. The toy's sub-type may also identify that the toy is one of many variants of the same character. For example, a particular in-game character may be made into multiple toys, each with a different pose, color scheme, and/or equipment/clothing scheme. The toy's sub-type may be indicative of these attributes.

Fixed information 905 may also include an identification of objects related to the toy, such as an identification of a trading card. Fixed information 905 generally includes a field for data verification, for example, a cyclic-redundancy check value or checksum.

The data structure also includes a first data area 910 and a second data area 920. Each of the data areas contains corresponding fields for certain values representing status information about a game play character associated with the toy. However, the first data area and the second data area contain values that reflect the toy's status at different times. For example, the first data area may contain current values and second data area may contain previous values. How which of the data areas is current may be determined and controlled is described further below.

The first data area 910 includes a first header 911. The first header includes information about the toy that may change frequently during game play, such as fields that store score values, experience levels, or money values. The first header may also include a field indicating how much cumulative time the toy has been used for game play. The first header also contains a sequence field that may be used to determine whether the first data area contains current data.

The first data area 910 includes a first initial information area 912. The first initial information area includes information about the toy for use in adding the character associated with the toy to game play. For example, the first initial information area may include a field that stores a name for the toy. The first initial information area may include additional fields that store information useful for displaying a representation of the character associated with the toy in the game. For example, there may be information indicating upgrades that have been acquired for the character associated with toy or objects the character may be wearing, such as hats. In some embodiments, however, the fixed information may contain sufficient information for adding the character associated with to the toy to game play, with the fixed information used instead of the initial information.

The first data area 910 includes a first further information area 913. The first further information area includes fields that indicate additional information about the character's status beyond the information contained in the first header and the first initial information area. The fields in the first further information area may include, for example, a value indicating when the character associated with the toy most recently joined the game, a value indicating when the toy was first used in the game, an indication of a player to which the toy belongs, and an indication of what challenges or skill tests the character associated with the toy has completed in the game.

The first data area generally includes one or more fields for data verification, for example, checksums. In one embodiment, the first header includes three checksums: a checksum for the entire first data area, a checksum for the initial information area, and a checksum for the header itself. The inclusion of three checksums may allow the corresponding areas to be verified or updated without reading or writing other areas.

The second data area 920 includes a second header 921, a second initial information area 922, and a second further information area 923. Each of the areas in the second data area corresponds to a like named area in the first data area. In some embodiments, the data structure includes additional data areas, for example, a third data area and a fourth data area.

FIGS. 9B, 9C, and 9D show tables of exemplary fixed information data fields in accordance with aspects of the present invention. FIG. 9B shows an example table of toy type codes for a fantasy video game. In the example of FIG. 9B, the toy type code is an 8-bit binary number that corresponds to one of three in-game characters that the toy represents. "Dave the Dragon" toys, for example, are encoded as type "00000000." "Nick the Knight" and "Wally Wizard" toys are encoded as types "00000001" and "00000010," respectively. Of course, alternative encodings and formats may be used. Newer versions of the video game may utilize the same toy type encoding scheme as earlier versions of the video game to ensure new versions of the video game support older toys.

FIGS. 9C and 9D show example tables of toy sub-type codes for the same fantasy video game. In the examples of FIGS. 9C and 9D, the sub-type code is a 16-bit binary number, with the eight most significant bits representing the toy's version information, and the eight least significant bits representing the toy's feature information. FIG. 9C shows example version codes for a fantasy video game. As shown, a toy may be associated with one of three versions of the video game. For example, a toy having version code "00000000" would be associated with the original version of the video game released in 2011. Toys having version codes "00000001" and "00000010" would be associated with the 2012 sequel and 2013 sequel, respectively. The version code allows a video game to differentiate toys made for various versions of the video game and conduct gameplay accordingly. In some embodiments, if a particular toy feature is only available in toys associated with a particular version of the video game, the video game uses the toy's version information to determine whether the toy includes that particular feature. In some embodiments, a video game uses a toy's version information to determine whether the toy is associated with a future version of the video game and conducts gameplay accordingly. For example, if the video game determines that a toy is associated with a future version of the video game, it may modify gameplay by altering the appearance, abilities, attributes, or display name of the in-game character corresponding to the toy. Other examples of modified gameplay include granting bonuses to the user such as level or experience points or unlocking new levels for the player.

FIG. 9D shows example features codes for toys of the fantasy video game. The feature codes may be used to indicate any number of features or attributes for the toy that are fixed, including for example, the toy's pose, paint/color scheme, clothing/equipment, and audiovisual capabilities (e.g., lighting, display, sound effects). In the example of FIG. 9D, a standard, unaltered toy would have a corresponding feature code of "00000000." Alternate poses of the same toy type made for the 2012 and 2013 versions of the video game would have feature codes of "00000001" and "00000011," respectively. A variant of the toy type that has an alternative decoration (e.g., paint/color scheme, costume, etc.) introduced in conjunction with a 2012 promotional event corresponds to feature code "00000010." A variant of the toy type that supports light-up electronic effects corresponds to feature code "00000100." In some embodiments different sets of bits of the feature code may be independent of one another, with for example the bit indicative of a light enabled toy being independent of other bits of the feature code, such that for example a toy variant of either Repose 1 or Repose 2 may or may not also be light-enabled. These features and encodings are merely exemplary, and any number and type of fixed toy features may be encoded in the sub-type data field.

Figure 15:
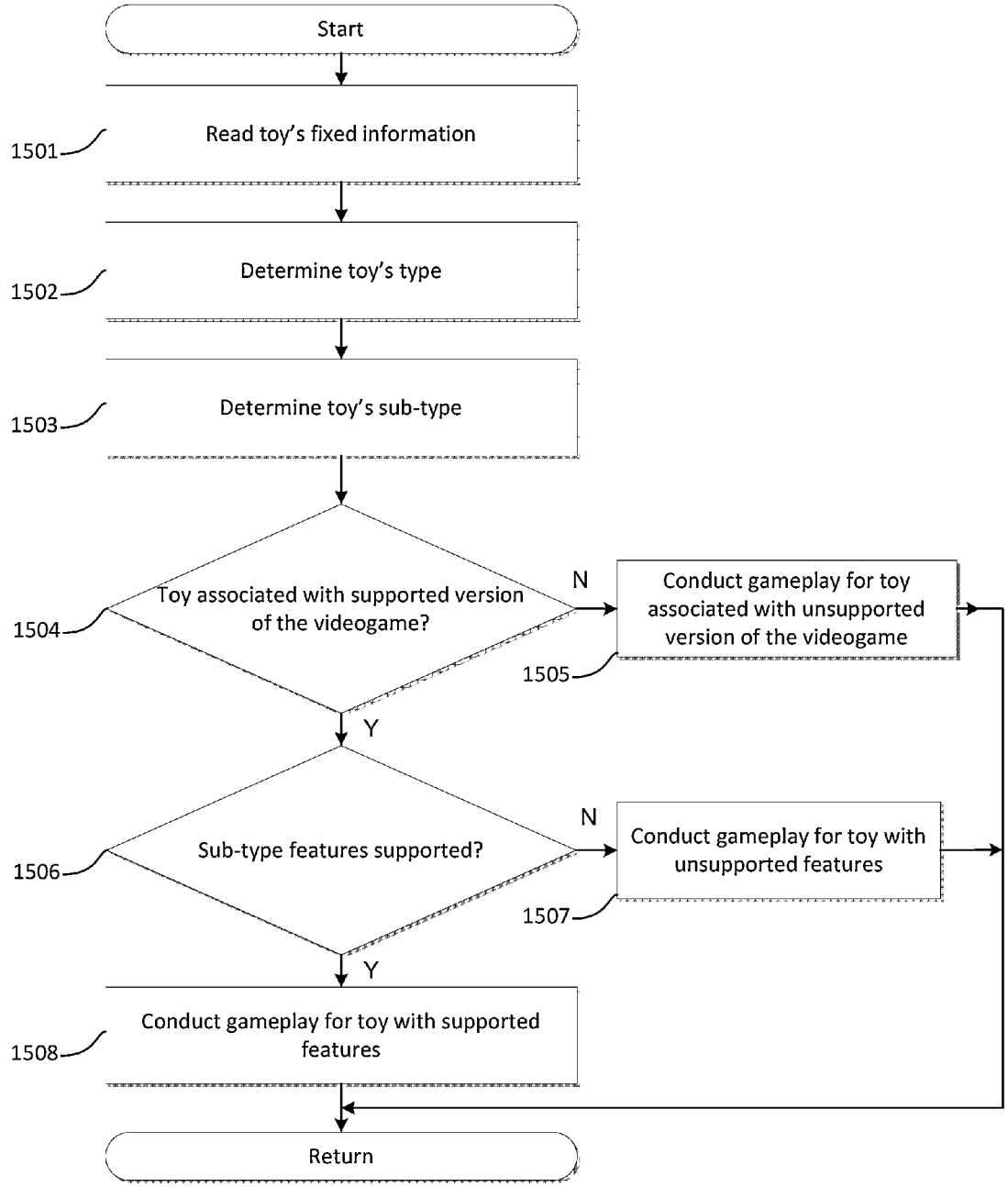
FIG. 15 is a flowchart of a process for conducting gameplay in accordance with aspects of the invention.

FIG. 15 is a flowchart of a process for conducting gameplay based on a toy's type and sub-type in accordance with aspects of the invention. The process may be as part of a process for communication with toys such as the process of FIG. 4. Accordingly, the process may be performed by a video game console, a video game peripheral, or a combination of devices, and the process may use a processor configured by program instructions.

In block 1501, the process reads the toy's fixed information. For example, the process may send a read command to acquire the fixed information from the toy. Accordingly, the command may include an address value indicating a memory location in the toy to be accessed.

In block 1502, the process determines the toy's type information, which identifies the type of the toy. In some embodiments, the toy's type information may identify that the toy is representative of a particular in-game character, weapon, level, or item.

In block 1503, the process determines the toy's sub-type information, which identifies additional fixed features and/or attributes relating to the toy. In some embodiments, the sub-type information may comprise version information that identifies the version of the video game that the toy is associated with. For example, as new versions, updates, or sequels of a video game are released, new or updated toys may also be released in connection with those versions of the video game. The version information may thus specify the particular version that the toy is released in connection with or originally made for. Additionally or alternatively, the toy's sub-type information may identify other fixed features of a toy, for example, whether the toy is equipped audiovisual components such as light-up effects, a display, speakers, or other components. The toy's sub-type may also identify that the toy is associated with a particular variant of one of many variants of the same game character. For example, a particular in-game character may be made into multiple toys, each with a different pose, color scheme, and/or equipment/clothing scheme. The toy's sub-type may reflect these attributes.

In block 1504, the process determines whether the toy sub-type indicates the toy is associated with a version of the video game not fully supported by the version of the video game being executed by or in conjunction with the process, for example, by comparing the version code of the toy with the version of the video game, or by determining if the version code of the toy is a version code known by the executed version of the video game. If the toy is associated with an at least partially unsupported version of the video game, for example a future version of the video game, the process proceeds to block 1505. In block 1505 the process conducts gameplay based at least in part on the determination that the toy is associated with an at least partially unsupported version of the video game. For example, the video game may modify gameplay by altering the appearance, abilities, attributes, or display name of the in-game character corresponding to the toy to reflect default values or configurations, or to a preidentified set of values or configurations. Other examples of modified gameplay include granting bonuses to the user such as level or experience points or unlocking new levels for the player.

If the process determines that the toy is not associated with an at least partially unsupported version of the video game, the process proceeds to block 1506. In block 1506, the process determines whether the toy includes supported sub-type features, for example by determining if the feature codes of the toy are known by the executed version of the video game. If the toy includes unsupported sub-type features, the process proceeds to block 1507, in which the process conducts gameplay based at least in part on the determination that the toy includes unsupported sub-type features. In some embodiments, the modifications to gameplay triggered by toys including unsupported sub-type features may be the same as the modifications to gameplay triggered by toys associated with future versions of the video game. Alternatively, the modifications to gameplay triggered by toys including unsupported sub-type features may be different from those triggered by toys associated with future versions of the video game.

If the process determines that the toy includes only features supported by the video game, then the process proceeds to block 1508. In block 1508, the process conducts gameplay for the toy with supported features. The process then returns.

Figure 10:
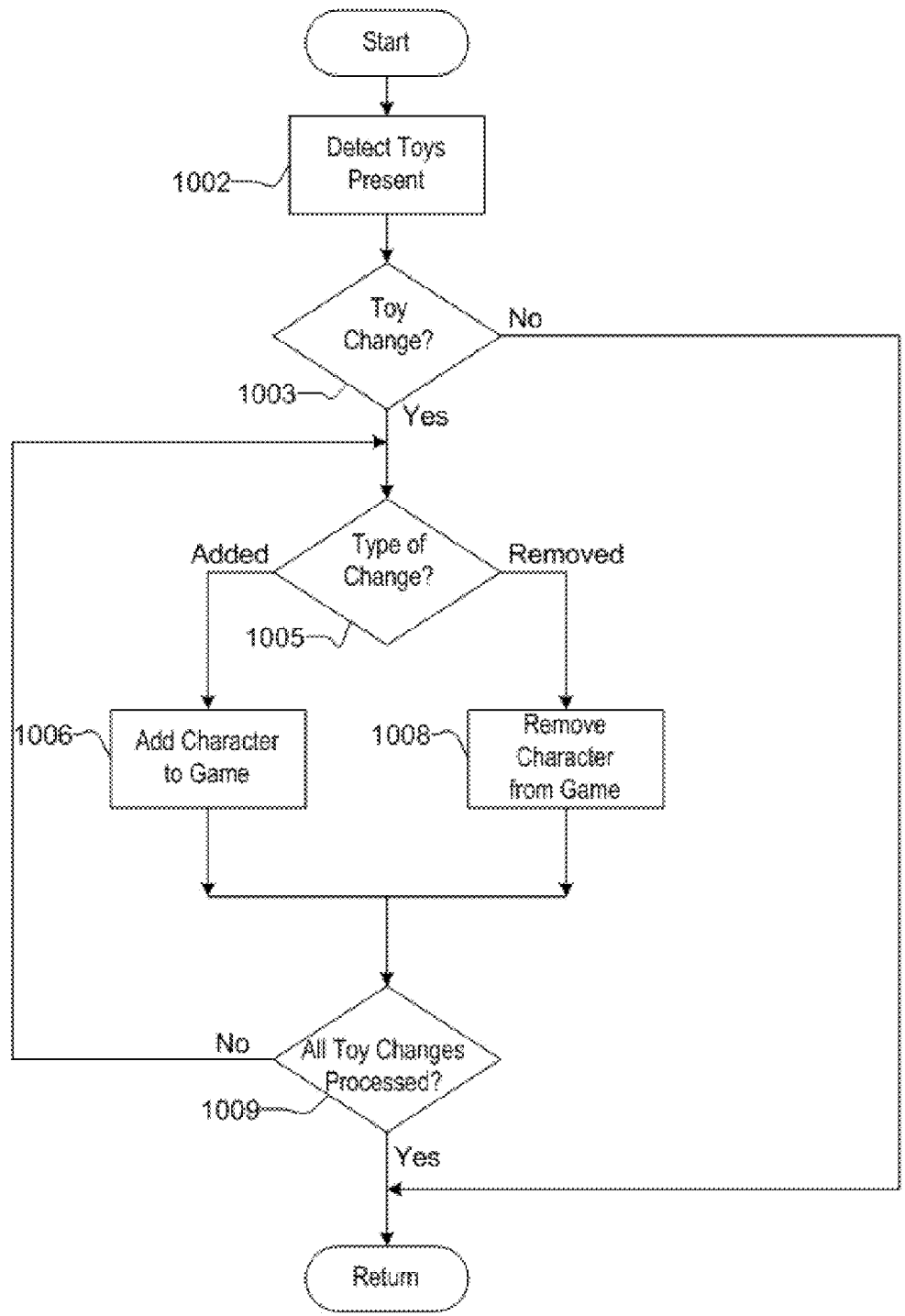
FIG. 10 is a flowchart of a process for changing characters present in a video game in accordance with aspects of the invention.

FIG. 10 is a flowchart of a process for changing characters present in a video game in accordance with aspects of the invention. The process may be performed by a video game console, a video game peripheral, or a combination of devices, and the process may use a processor configured by program instructions. Additionally, the process is generally performed repeatedly during play of the video game, for example, every second.

In block 1002, the process detects toys present on or near a toy reader. In some embodiments, the process detects toys using a video game peripheral as described with reference to FIG. 3, and the process may detect which toys are present using a process as described with reference to FIG. 5.

In block 1003, the process determines whether there has been a change in the toys present. For example, the process may compare identifiers of the toys detected in block 1002 to a list of toy identifiers currently considered present in the video game or detected on a prior execution of the process. In some embodiments, the process may use a count of the toys present to determine a change in the toys present. When the process determines that there has been a change in the toys present, the process continues to block 1005; otherwise, the process returns.

In block 1005, the process determines a type of change in the toys present. When the process determines that the type of change in the toys present includes an addition of a toy, the process continues to block 1006; when the process determines that the type of change in the toys present includes a removal of a toy, the process continues to block 1008. When the type of change includes both addition and removal, the process, in various embodiments, may determine the type of change based on a fixed priority, a dynamic priority, or randomly depending, for example, on characteristics of the video game. In other embodiments, the process may continue to block 1006 and block 1008 concurrently.

In block 1006, the process adds a character associated with an added toy to the video game. For example, the process may display a representation of the character in the game and include the character in game play. When multiple toys have been added the process may select one of the toys to be added first. For example, the process may select a toy based on a prioritization or randomly. In other embodiments, the process may add characters associated with multiple toys concurrently. Thereafter the process continues to block 1009.

In block 1008, the process removes the character associated with a removed toy from the video game. For example, the process may remove display of a representation of the character from the game and exclude the character from subsequent game play. When multiple toys have been removed the process may select one of the toys to be removed first. In other embodiments, the process may remove multiple toys concurrently. Thereafter the process continues to block 1009.

In block 1009, the process determines whether all of the changes in toys present have been processed. The process may, for example, form a list of changes in block 1003 and remove toys from the list when the toys are added to the game in block 1006 or removed from the game in block 1008. When the process determines all of the changes have been processed, the process returns; otherwise, the process returns to block 1005.

Figure 11:
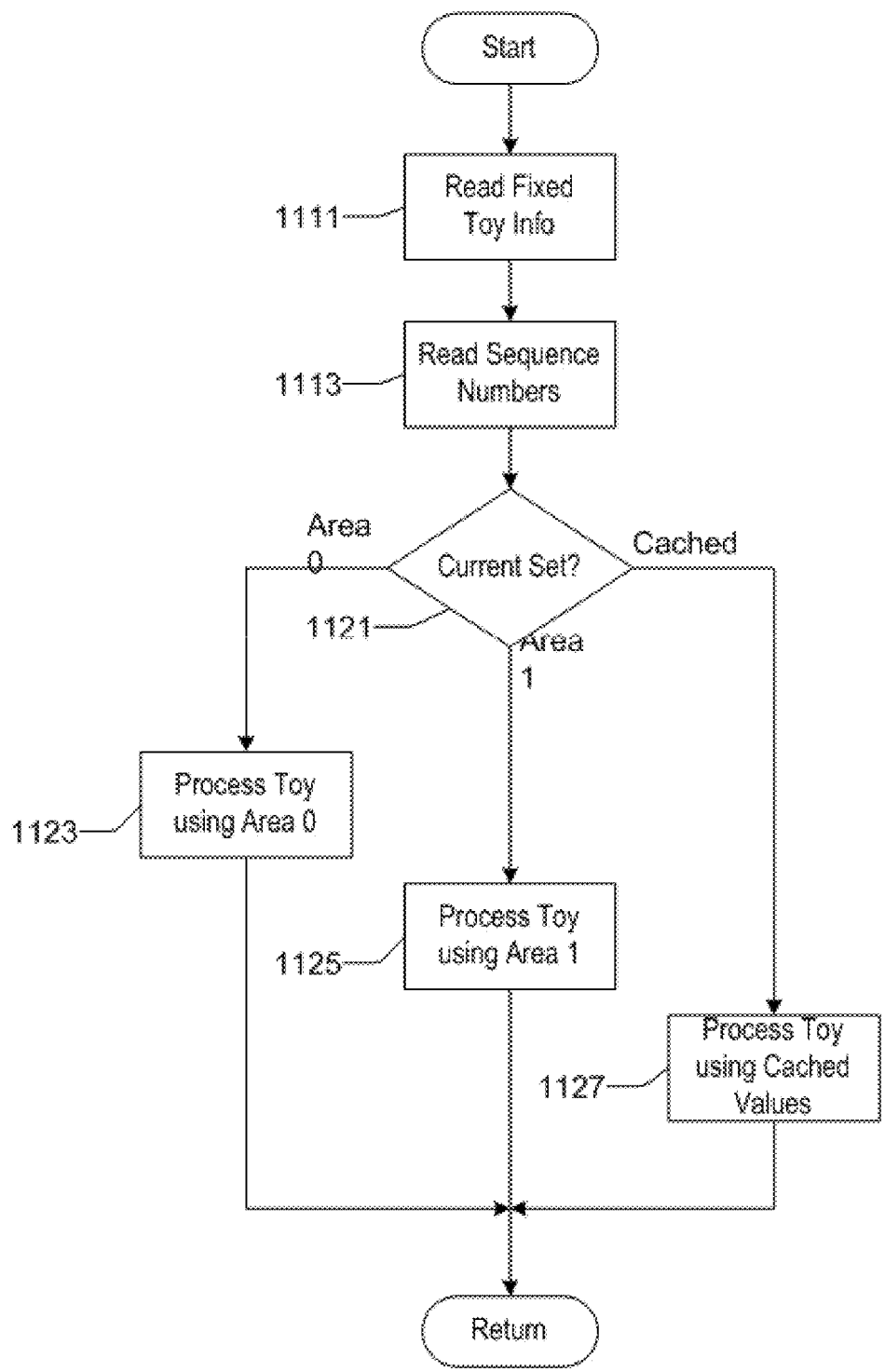
FIG. 11 is a flowchart of a process for adding characters in a video game in accordance with aspects of the invention.

FIG. 11 is a flowchart of a process for adding characters in a video game in accordance with aspects of the invention. The process may be performed by a video game console, a video game peripheral, or a combination of devices, and the process may use a processor configured by program instructions. The process of FIG. 11 may be performed in association with the process for changing characters present in a video game of FIG. 10. Additionally, the process may be used with toys that store information in a data structure as illustrated by FIG. 9. Multiple instances of the process may be concurrently, for example, an instance of the process for each of multiple toys.

In block 1111, the process reads fixed information from a toy. The information may be read using a process as shown in FIG. 4. The fixed information includes values that uniquely identify the toy and type of toy.

In block 1113, the process reads sequence values for each of multiple data areas of toy information. The flowchart of FIG. 11 illustrates a process for toys with two data areas, data area 0 and data area 1, but other numbers of data areas may be used. The sequence numbers may be stored in headers of the data areas. Each sequence value indicates when, in comparison to other headers, the header was written. For example, the sequence value may be incremented modulo a maximum value each time a header is written. The process may, in some embodiments, also determine a sequence number for cached data values associated with the toy. The video game may save data values for the toy in a cache from when the toy was previously played in the game. The cached data values may, for example, be useful when they contain updated values that had not been written to the toy before the toy was previously removed from the video game.

In block 1121, the process determines which sequence value is most recent. The process may order the sequence values according to the order in which they would be generated and select the last in sequence as the most recent. When the process determines that the sequence value from data area 0 is most recent, the process continues to block 1123; when the process determines that the sequence value from data area 1 is most recent, the process continues to block 1125; when the process determines that the cached sequence value is most recent, the process continues to block 1127.

In block 1123, the toy is processed using data area 0. For example, the process may read toy information from data area 0 and use the information to add a character associated with the toy to the video game. Thereafter the process returns.

In block 1125, the toy is processed using data area 1. Processing the toy is generally as for block 1123 except information from data area 1 is used. Thereafter the process returns.

In block 1127, the toy is processed using cached values. Processing the toy is generally as for block 1123 except cached information about the toy is used. Thereafter the process returns.

The process of FIG. 11 may include error checking of information read from the toy. When the process determines that data read from the toy contains an error or is unreliable, it may alter the processing. For example, if one of the sequence numbers read in block 1113 is unreliable, the associated data area may be excluded from further processing.

Figure 12:
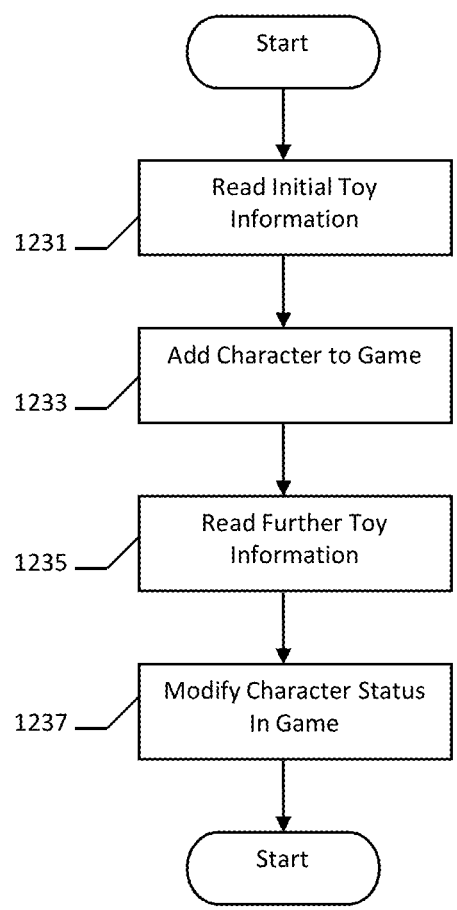
FIG. 12 is a flowchart of a further process for adding characters in a video game in accordance with aspects of the invention.

FIG. 12 is a flowchart of a further process for adding characters in a video game in accordance with aspects of the invention. The process may be performed by a video game console, a video game peripheral, or a combination of devices, and the process may use a processor configured by program instructions. The process of FIG. 12 may be performed as part of block 1006 of the process of FIG. 10 and also in association with the process of FIG. 11. The process may be used with toys that store information in a data structure as illustrated by FIG. 9.

In block 1231, the process reads initial information from the toy. The initial information includes information about the toy that is used to add the toy to game play. In some embodiments, the initial information is read using a process illustrated by FIG. 4. In some embodiments, the initial information includes a name of the toy and objects the toy is wearing. In one embodiment, the process commands a video game peripheral to read the initial information from the toy. In another embodiment, the process may receive initial information that had previously been read by a video game peripheral.

In block 1233, the process adds the toy to the video game. For example, the process may display a representation of a character associated with the toy or an animated sequence for the character on the display screen of the video game system illustrated by FIG. 1. Displaying the character utilizes the initial information read in block 1231. The process also makes the character available for subsequent game play.

In block 1235, the process reads further information from the toy. The further information is generally read in the same manner the initial information was read in block 1231. The further information may include, for example, a value indicating when the toy most recently joined the game, a value indicating when the toy was first used in the game, an indication of which player the toy belongs to, and an indication of what challenges or skill tests the character associated with the toy has completed in the game, and various information related to the status, for example the capabilities, of the character associated with the toy, for example as may have been modified or changed as a result of prior game play. The further information combined with the fixed and/or initial information generally includes complete information available from the toy.

In block 1237, the process modifies status of the character associated with the toy in the video game. For example, the process may add details read in block 1235 to the character representing the toy and to the status of the character in the video game. Thereafter the process returns.

Figure 13:
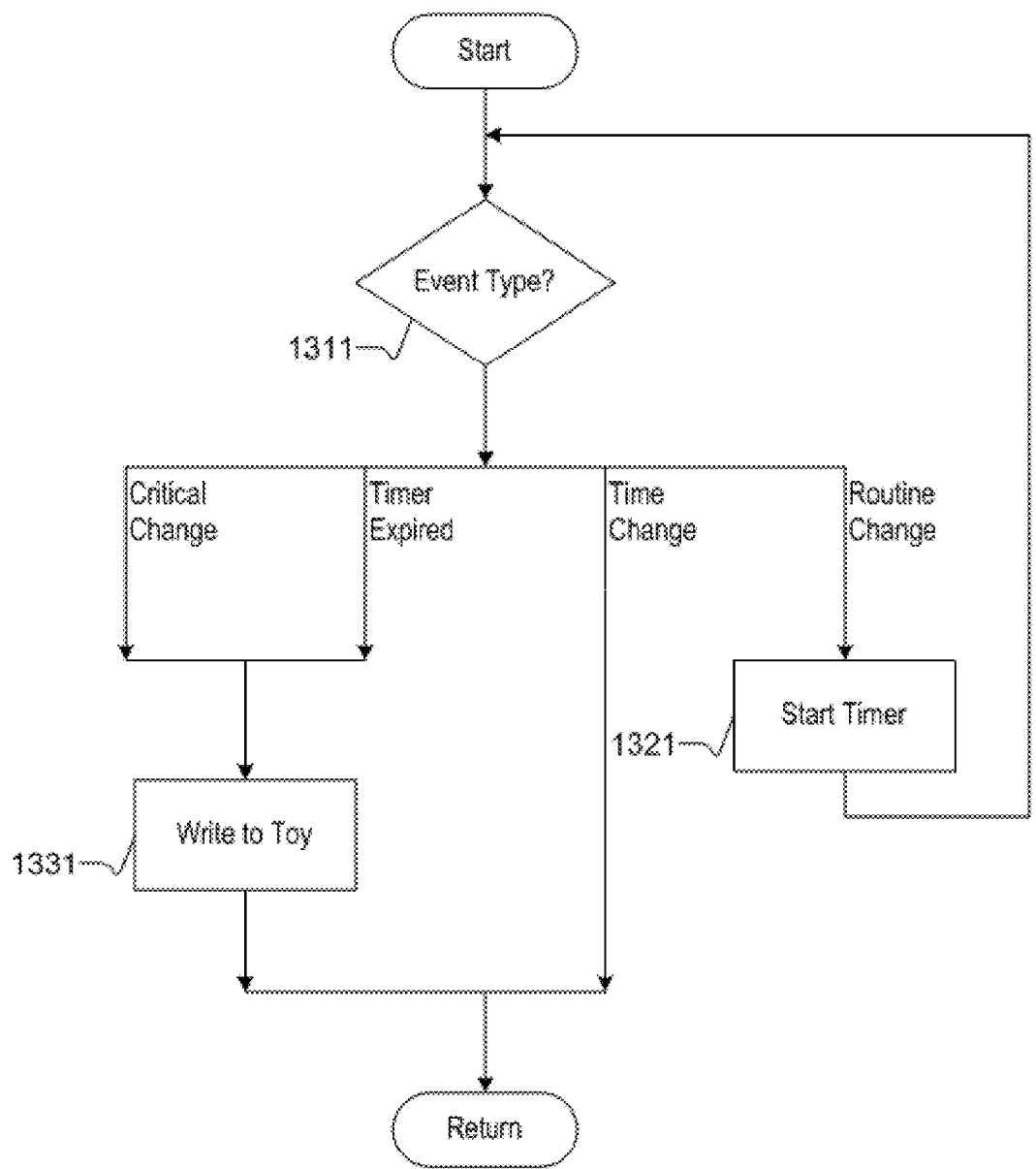
FIG. 13 is a flowchart of a process for events that update toy information in accordance with aspects of the invention.

FIG. 13 is a flowchart of a process for processing events that update toy information in accordance with aspects of the invention. The process is performed in association with a video game and may be performed by, for example, the video game console of FIG. 1 or the processor of FIG. 2, as configured by program instructions, in conjunction with associated circuitry. The process may be used with toys that store information in a data structure as illustrated by FIG. 9. Additionally, multiple instances of the process may be performed concurrently, for example, performing an instance of the process for each of multiple toys.

In block 1311, the process determines a type of event that may result in updating information in the toy. The process may determine the event type based at least in part on game play events.

In block 1311, if the process determines that the event type is a time change, the process returns. That is, a time-change event does not result in the process currently writing information to the toy. In some embodiments, the process writes time-based information, for example, a cumulative play time value or a last time played, to the toy when another event causes the process to write other information to the toy.

In block 1311, if the process determines that the event type is a critical type, the process continues to block 1331. A critical-type event is an event for which it is desirable to quickly update information in the toy. Critical-type events may include, for example, changes to the toy's name, changes to performance levels of the toy, or acquisition of upgrades for the toy.

In block 1311, if the process determines that the event type is a routine type, the process continues to block 1321. A routine-type event is an event for which writing information to the toy may be deferred. Routine-type events may include, for example, changes to the toy's score or changes to the experience level of the toy. Routine-type events may occur frequently during game play and thus it may be desirable to otherwise use the time that would be used to write to the toy, for example, to process information for another toy.

In block 1321, the process starts a timer. For example, the process may start a timer that expires in three seconds. When the timer is already running, the process may, in various embodiments, restart the timer or let it continue running from its current state. The process thereafter returns to block 1311.

Referring again to block 1311, when the timer expires, the process continues to block 1331.

In block 1331, the process writes information to the toy. The process may write information to the toy by commanding a video game peripheral, such as the video game peripheral of FIG. 2, to perform the write. The written information generally corresponds to the event analyzed in block 1311. For example, when the event is an event to change the toy's name, a new name is written to the toy. Additional information may also be written to the toy. For example, time-based information or information based on a routine-type event may be written to the toy concurrently with writing information based on a critical-type event. The timer started in block 1321 is stopped when the process writes information to the toy related to the routine-type event that resulted in starting the timer. Although the timer started in block 1321 is not used for critical-type events, the process may incur incidental delays before writing information to the toy in block 1331. Thereafter the process returns.

Figure 14:
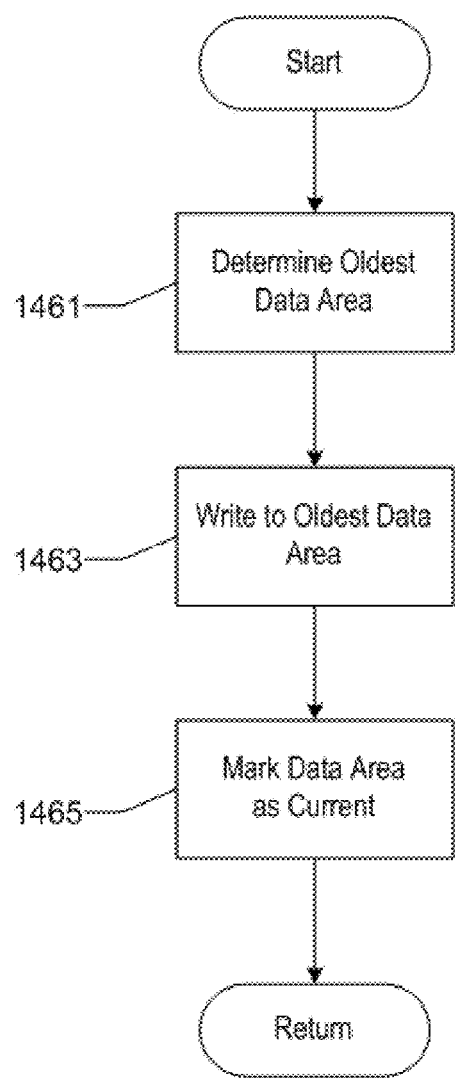
FIG. 14 is a flowchart of a process for writing information to a toy in accordance with aspects of the invention.

FIG. 14 is a flowchart of a process for writing information to a toy in accordance with aspects of the invention. The process is performed in association with or as part of a video game. The process may be performed by a video game console, a video game peripheral, or a combination of devices, and the process may use a processor configured by program instructions. The process of FIG. 14 may be performed in association with the process for updating toy information of FIG. 13 and may be used with toys that store information in a data structure as illustrated by FIG. 9. Additionally, multiple instances of the process may be performed concurrently, for example, an instance of the process for each of multiple toys.

In block 1461, the process determines the oldest of multiple data areas in the toy. The process may determine the oldest data area using sequence values in a manner analogous to that used to determine the current data area in the process of FIG. 11. In a particular embodiment in which there are two data areas in the toy, the oldest data area is the data area that is not the current data area.

In block 1463, the process writes to the data area determined to the oldest in block 1461. Writes may be performed using a process as shown in FIG. 4. In some embodiments, the process compares the data to be written to the toy with data previously read from the toy and omits writes would not change values in the toy.

In block 1465, the process marks the data area written to in block 1463 as the current data area. For data areas with sequence values, the process writes the next value in the sequence to the toy. For example, the sequence value from the previously current data area may be incremented, modulo a maximum value, and written to the toy.

The process, in many embodiments, verifies that the information writes to the toy were successful. For example, the process may read the values back from the toy and compare the results to the expected values. In the event of an error, the process may retry writing the information to the toy. Additionally, the process may write to the toy in blocks of data and in a particular order, for example, a checksum for the data may be written last.

Although the invention has been discussed with respect to various embodiments, it should be recognized that the invention comprises the novel and non-obvious claims supported by this disclosure.

What is claimed is:

1. A video game system, comprising:
a removable medium storing program instructions of a first version of a video game;
a first physical toy associated with the first version of the video game, the first physical toy comprising first memory, the first memory storing data identifying which version of the video game that the first physical toy is associated with;
a second physical toy associated with a second version of the video game, the second version of the video game being different than the first version of the video game, the second physical toy comprising second memory, the second memory storing data identifying which version of the video game that the second physical toy is associated with;
a peripheral configured to read the data stored in the first memory of the first physical toy when the first physical toy is proximal to the peripheral and configured to read the data stored in the second memory of the second physical toy when the second physical toy is proximal to the peripheral;
a processor configured by the program instructions of the first video game and coupled to the peripheral, the program instructions comprising instructions to:
receive, by the processor, the data read from the first memory of the first physical toy;
utilize data read from the first memory of the first physical toy to determine, by the processor, that the first physical toy is associated with the first version of the video game;
conduct, by the processor, video game gameplay of the first version of the video game involving a representation of a game character associated with the first physical toy, wherein aspects of the video game gameplay are based in part on the determination that the first physical toy is associated with the first version of the video game;
receive, by the processor, the data read from the second memory of the second physical toy;
utilize the data read from the second memory of the second physical toy to determine, by the processor, that the second physical toy is not associated with the first version of the video game; and
conduct, by the processor, video game gameplay of the first version of the video game involving a representation of a game character associated with the second physical toy, wherein aspects of gameplay are based in part on the determination that the second physical toy is not associated with the first version of the video game;
wherein the aspects of gameplay based in part on the determination that the second physical toy is not associated with the first version of the video game include providing a display name, appearance, and attributes for the game character associated with the second physical toy reflecting pre-identified default values.

2. The video game system of claim 1, wherein the data identifying which version of the video game that the first physical toy is associated with is comprised of sub-type information of the first physical toy and the data identifying which version of the video game that the second physical toy is associated with is comprised of sub-type information of the second physical toy.

3. The video game system of claim 2, wherein the data stored in the first memory of the first physical toy and the data stored in the second memory of the second physical toy further include a type information for identifying a type of physical toy.

4. The video game system of claim 3, wherein the type information of the first physical toy and the type information of the second physical toy are 8-bit binary numbers.

5. The video game system of claim 2, wherein the sub-type information of the first physical toy and the sub-type information of the second physical toy are 16-bit binary numbers.

6. The video game system of claim 1, wherein the peripheral includes a radio-frequency interface for communicating with physical toys.

7. The video game system of claim 1, wherein the peripheral is further configured to send a first read command to acquire the data stored in the first memory of the first physical toy and a second read command to acquire the data stored in the second memory of the second physical toy.

8. The video game system of claim 7, wherein the first read command includes an address value indicating a first memory location in the first memory of the first physical toy and the second read command includes an address value indicating a second memory location in the second memory of the second physical toy.

9. A computer-implemented method useful in playing a video game having multiple versions, the method being implemented by a video game platform that includes one or more processors, with the video game platform executing program instructions for a first version of the video game, the method comprising:
- receiving, by the one or more processors, information from a memory of a physical toy, the information comprising type information and subtype information, the information being read from the physical toy by a peripheral device, the type information indicating a game character associated with the physical toy, the sub-type information indicating a version of the video game that the physical toy is associated with and indicating fixed features of the physical toy;
- determining, by the one or more processors, whether the subtype information indicates that the physical toy is associated with a known version of the video game;
- if the physical toy is associated with the known version of the video game, displaying a representation of the game character associated with the physical toy, the representation of the game character based at least on the type information and the subtype information;
- if the physical toy is not associated with the known version of the video game, conducting gameplay involving the representation of the game character, including unlocking new levels in the video game, based on a determination that the physical toy is not associated with the known version of the video game, and wherein aspects of the gameplay are based in part on the determination that the physical toy is not associated with the known version of the video game.

10. The method of claim 9, wherein the determination whether the physical toy is associated with the known version of the video game includes a determination whether features of the physical toy are supported by the version of the video game.

11. The method of claim 9, wherein the determination whether the physical toy is associated with the known version of the video game includes a determination whether the physical toy is associated with an at least partially unsupported version of the video game.

12. The method of claim 9 wherein conducting gameplay involving the representation of the game character includes modifying attributes of the game character to a pre-identified set of configurations.

13. The method of claim 9 further comprising commanding, by the one or more processors, the peripheral to acquire the information from the memory of the physical toy.

14. The method of claim 13, further comprising, in response to the command to acquire the information from the memory of the physical toy, sending, by the peripheral, a read command having an address value indicating a memory location in the memory of the physical toy.

15. The method of claim 9, wherein the indication of fixed features of the physical toy indicates whether the physical toy is equipped with audio-visual components.

16. The method of claim 15, wherein the audio-visual components comprise at least one of light-up effects or speakers.

* * * * *